US008365529B2

(12) United States Patent
Litwin et al.

(10) Patent No.: US 8,365,529 B2
(45) Date of Patent: Feb. 5, 2013

(54) HIGH TEMPERATURE MOLTEN SALT RECEIVER

(75) Inventors: Robert Z. Litwin, Canoga Park, CA (US); Andrew J. Zillmer, Woodland Hills, CA (US); Nathan J. Hoffman, Canoga Park, CA (US)

(73) Assignee: United Technologies Corporation, Hartford, CT (US)

( * ) Notice: Subject to any disclaimer, the term of this patent is extended or adjusted under 35 U.S.C. 154(b) by 1616 days.

(21) Appl. No.: 11/479,635

(22) Filed: Jun. 30, 2006

(65) Prior Publication Data

US 2008/0000231 A1   Jan. 3, 2008

(51) Int. Cl.
*B60K 16/00*   (2006.01)
(52) U.S. Cl. ................... 60/641.11; 60/641.15
(58) Field of Classification Search ..... 60/641.8–641.15
See application file for complete search history.

(56) References Cited

U.S. PATENT DOCUMENTS

| | | | |
|---|---|---|---|
| 4,362,149 A | 12/1982 | Thomson | |
| 4,668,494 A * | 5/1987 | Van Hook | 423/392 |
| 4,768,345 A | 9/1988 | Kardas | |
| 5,242,563 A * | 9/1993 | Stern et al. | 204/241 |
| 5,482,233 A | 1/1996 | Marko et al. | |
| 5,862,800 A * | 1/1999 | Marko | 126/680 |
| 6,346,349 B1 * | 2/2002 | Briscoe et al. | 429/231.95 |
| 6,701,711 B1 * | 3/2004 | Litwin | 60/641.11 |
| 6,932,567 B2 | 8/2005 | Albers et al. | |
| 6,957,536 B2 * | 10/2005 | Litwin et al. | 60/641.8 |
| 7,051,529 B2 * | 5/2006 | Murphy et al. | 60/641.8 |
| 2004/0086021 A1 * | 5/2004 | Litwin | 374/120 |
| 2004/0244376 A1 * | 12/2004 | Litwin et al. | 60/641.8 |
| 2005/0126170 A1 * | 6/2005 | Litwin | 60/641.8 |

OTHER PUBLICATIONS

Misra, A.K., et al., Estimated Heats of Fusion of Fluoride Salt Mixtures Suitable for Thermal Energy Storage Applications, May 1986, pp. 1-2.
Tolbert, Carol M., et al., Experimental Results from the Thermal Energy Storage-1 (TES-1) Flight Experiment, http://www.grc.nasa.gov/WWW/RT1995/5000/5490t.htm, pp. 1-2.
Article entitled, "Developments in Molten Salt and Liquid-Salt-Cooled Reactors", Charles W. Forsberg, 2006 International Congress on the Advances in Nuclear Power Plants (ICAPP 06), Embedded Topical in the 2006 American Nuclear Society Annual Meeting, Jun. 4-8, 2006, pp. 1-12, XP007915574.
Article entitled, "The LM-LS Experiment: investigating corrosion control, in Liquid Fluoride Salts, by Liquid alkali Metal", Thesis in Completion of the Requirements for the Master of Science Degree in Nuclear Engineering of the University of California Berkely, Blandine Laurenty, Jan. 1, 2006, pp. 1-91, XP007915575.
European Search Report, mailed Nov. 12, 2010.

\* cited by examiner

*Primary Examiner* — Hoang Nguyen
(74) *Attorney, Agent, or Firm* — Kinney & Lange, P.A.

(57) ABSTRACT

A high temperature solar power tower system includes a molten salt heat transfer medium, a high temperature solar receiver, and an energy conversion system. The molten salt heat transfer medium is capable of being heated to a temperature of at least approximately 1200 degrees Fahrenheit by the high temperature solar receiver. The energy conversion system uses the heated molten salt to generate power.

4 Claims, 2 Drawing Sheets

HIGH TEMPERATURE MOLTEN SALT RECEIVER

BACKGROUND OF THE INVENTION

The present invention relates generally to solar power tower generation systems. In particular, the invention relates to a solar power tower generation system with high operating temperatures.

There is a continuing demand for clean renewable energy sources, such as solar power. Solar power towers generate electric power from sunlight by focusing concentrated solar radiation on a tower-mounted receiver. Solar power tower systems typically include a "cold" storage tank, a solar receiver, heliostats, a "hot" storage tank, and an energy conversion system, such as a steam generator or turbine/generator set. In operation, a heat transfer fluid is pumped from the cold storage tank to the solar receiver. The heat transfer fluid can be any medium that has the capability to transfer heat and thermally maintain the heat in the medium, such as water, liquid metal, or molten salt.

The solar receiver is typically positioned 50 feet to 250 feet or more above ground and is heated by the heliostats. The heliostats redirect and concentrate solar radiation from the sun onto the solar receiver, which converts the redirected sunlight to thermal energy. The heat transfer fluid flows through receiver tubes of the solar receiver where it is heated by the concentrated solar energy. In the solar receiver, liquid metals have been used as the heat transfer fluid and can reach temperatures of approximately 1600 degrees Fahrenheit (° F.) and molten salts currently being used as the heat transfer fluid can reach temperatures of approximately 1100° F.

After the heat transfer fluid has been heated in the solar receiver, the heat transfer fluid flows into the hot thermal storage tank. The heat transfer fluid is then stored in the hot thermal storage tank until it is needed for electrical power generation. The hot thermal storage tank allows for electrical power production that is not concurrent with the availability of sunlight. When electrical energy is needed, the heated heat transfer fluid is pumped from the hot thermal storage tank and circulated through the energy conversion system. The heat transfer fluid transfers the heat within the energy conversion system. The energy conversion system can be, for example, a Rankine cycle conversion system or a Brayton cycle conversion system. After the heat has been removed from the heat transfer fluid, the heat transfer fluid is transported back to the cold storage tank for reuse. In general, the higher the temperature of the heat transfer fluid, the more efficient the solar tower power system. Thus, heat transfer fluids and systems capable of withstanding higher temperatures are desirable.

BRIEF SUMMARY OF THE INVENTION

A high temperature solar power tower system includes a molten salt heat transfer medium, a high temperature solar receiver, and an energy conversion system. The molten salt heat transfer medium is capable of being heated to high temperatures, for example, a temperature of at least approximately 1200 degrees Fahrenheit by the high temperature solar receiver. The energy conversion system uses thermal energy from the molten salt heat transfer medium to generate power.

DETAILED DESCRIPTION

Figure 1:
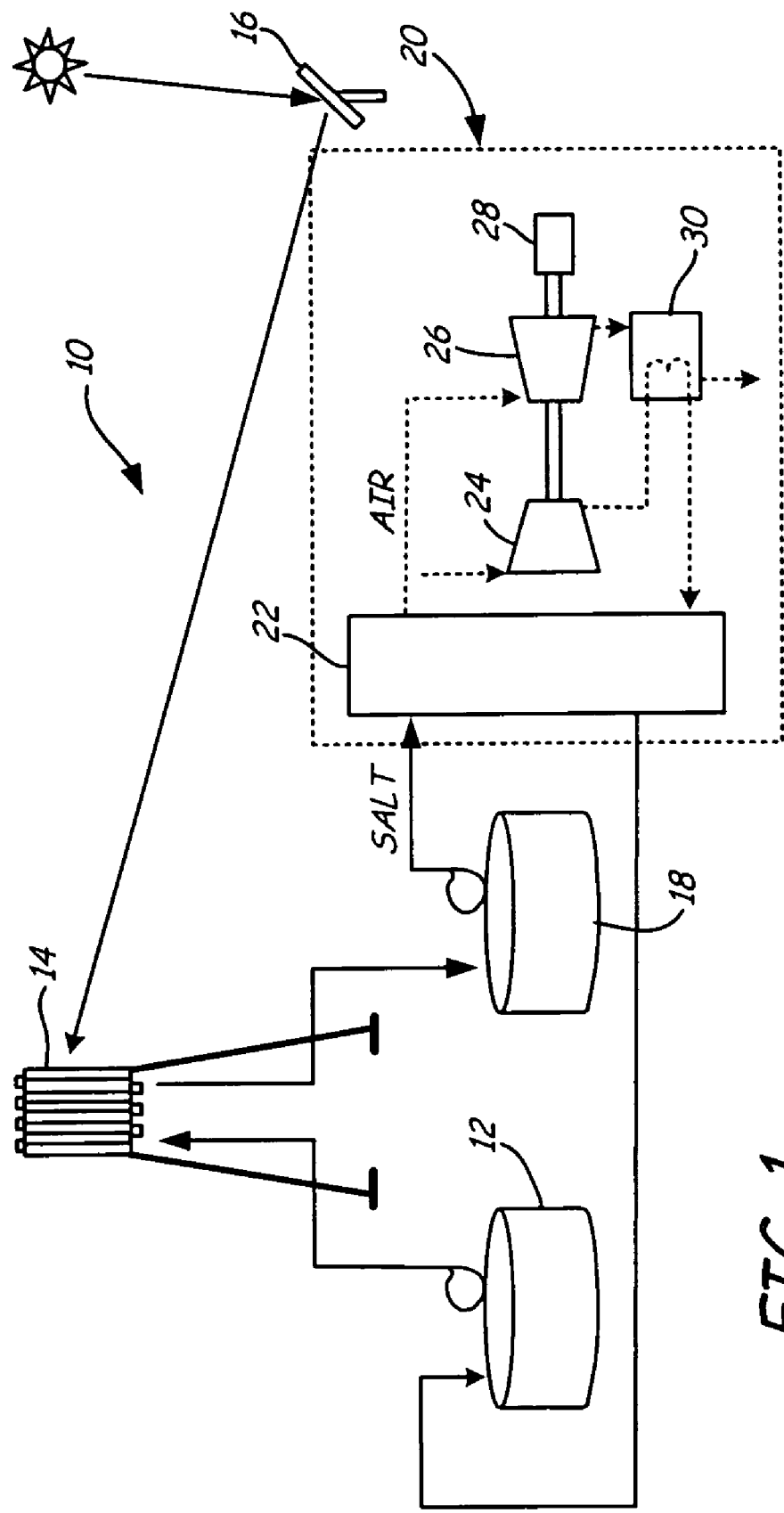
FIG. 1 is a schematic of a solar power tower system using high temperature molten salt.

FIG. 1 shows a schematic of solar power tower system 10 using high temperature molten salt. Solar power tower system 10 generally includes cold storage tank 12, solar receiver 14, heliostats 16, hot storage tank 18, and energy conversion system 20. A high temperature molten salt is used as the heat transfer medium through solar power tower system 10. The use of high temperature molten salt and hot thermal storage tank 18 enables solar power tower system 10 to provide electricity (and heat energy) up to 24 hours a day and to operate at sufficiently high temperatures so that the heat energy can be used in a reasonably efficient manner to operate a gas turbine, simplifies solar power conversion system 20, and reduces system dependency on water when compared to other cycles, such as Rankine steam cycles.

As described above, the heat transfer medium is stored in cold storage tank 12. When needed, the heat transfer medium is pumped to solar receiver 14, which is heated by solar radiation reflected from a field of multiple heliostats 16. Solar receiver 14 is capable of withstanding high temperatures, for example, temperatures of at least approximately 1200 degrees Fahrenheit (° F.), preferably at least approximately 1500° F., more preferably at least approximately 1700° F., and most preferably at least approximately 1800° F. Suitable materials for constructing solar receiver 14 include, but are not limited to: nickel based alloys, iron based alloys, and cobalt based alloys. Examples of suitable commercially available nickel based alloys include: Hastelloy X, Hastelloy N, Hastelloy C, and Inconel 718, available from Special Metals Inc., Conroe, Tex. Examples of suitable commercially available iron based alloys include: A-286 and PM2000, available from Metallwerke Plansee, Austria. An example of a suitable commercially available cobalt based alloy includes: Haynes 25, available from Haynes International Inc., Windsor, Conn.

After the heat transfer medium has been heated to its desired temperature, the heat transfer medium is pumped to hot storage tank 18, where it is stored until needed by energy conversion system 20. The heated heat transfer medium is pumped to energy conversion system 20 to generate power. Solar power tower system 10 is used in conjunction with an air Brayton cycle conversion system as energy conversion system 20. The use of a Brayton cycle conversion system as energy conversion system 20 eliminates the need for a steam Rankine cycle conversion system, reducing a significant amount of plant equipment. For example, a steam generator system, steam turbine, electric generator, cooling tower, water purification equipment, steam drum, aerator, water treatment system, and make-up water are no longer necessary. Instead, energy conversion system 20 requires only heat exchanger 22, compressor 24, expander 26, generator 28, and recuperator 30. The heat transfer medium is sent to heat exchanger 22 where the thermal energy from hot heat transfer medium is transferred to the air flowing through heat exchanger 22. The air is then sent through energy conversion system 20 to generate electricity. Use of an air Brayton cycle conversion system with a solar power tower system is described in U.S. Pat. No. 6,957,536 (Litwin et al.), which is hereby incorporated by reference.

After the heat transfer medium has passed through energy conversion system 20, the extracted thermal energy results in a drastic drop in the heat transfer medium temperature and it is sent back to cold storage tank 12. The heat transfer medium is reused in the closed cycle solar tower power system 10 and is stored in cold storage tank 12 until needed.

The heat transfer medium of solar power tower system 10 is a molten salt capable of being heated to high temperatures. The molten salt used to transfer heat from solar receiver 14 to energy conversion system 20 is capable of being heated to high temperatures, for example, to a temperature of at least approximately 1200 degrees Fahrenheit (° F.), preferably at least approximately 1500° F., more preferably at least approximately 1700° F., and most preferably at least approximately 1800° F. The molten salt can be salts composed of alkaline earth fluorides and alkali metal fluorides, and combinations thereof. Suitable elements of the molten salt include: Lithium (Li), Sodium (Na), Potassium (K), Rubidium (Rb), Cesium (Cs), Francium (Fr), Beryllium (Be), Magnesium (Mg), Calcium (Ca), Strontium (Sr), Barium (Ba), Radium (Ra), and Fluorine (F). Examples of suitable fluoride molten salts include, but are not limited to: FLiNaK, FLiBe, FLiNaBe, FLiKBe, and combinations thereof.

Suitable component concentrations in the composition of FLiNaK range from about 10 mol % to about 90 mol % LiF, about 1 mol % to about 30 mol % NaF, and about 10 mol % to about 90 mol % KF. Particularly suitable component concentrations in the composition of the present invention range from about 44 mol % to about 48 mol % LiF, about 9 mol % to about 12 mol % NaF, and about 40 mol % to about 44 mol % KF. Those skilled in the art will appreciate other suitable component concentration ranges for obtaining comparable physical properties of the molten salt.

Suitable component concentrations in the composition of FLiBe range from about 10 mol % to about 90 mol % LiF and about 10 mol % to about 90 mol % $BeF_2$. Particularly suitable component concentrations in the composition of the present invention range from about 44 mol % to about 48 mol % LiF and about 52 mol % to about 56 mol % $BeF_2$. Those skilled in the art will appreciate other suitable component concentration ranges for obtaining comparable physical properties of the molten salt.

Suitable component concentrations in the composition of FLiNaBe range from about 10 mol % to about 90 mol % $BeF_2$, about 10 mol % to about 90 mol % NaF, and about 10 mol % to about 90 mol % LiF. Particularly suitable component concentrations in the composition of the present invention range from about 25 mol % to about 35 mol % $NaBeF_4$ and about 65 mol % to about 75 mol % $Li_2BeF_4$. Those skilled in the art will appreciate other suitable component concentration ranges for obtaining comparable physical properties of the molten salt.

Suitable component concentrations in the composition of FLiKBe range from about 10 mol % to about 90 mol % KF, about 10 mol % to about 90 mol % LiF, and about 10 mol % to about 90 mol % $BeF_2$. Those skilled in the art will appreciate other suitable component concentration ranges for obtaining comparable physical properties of the molten salt.

Figure 2:
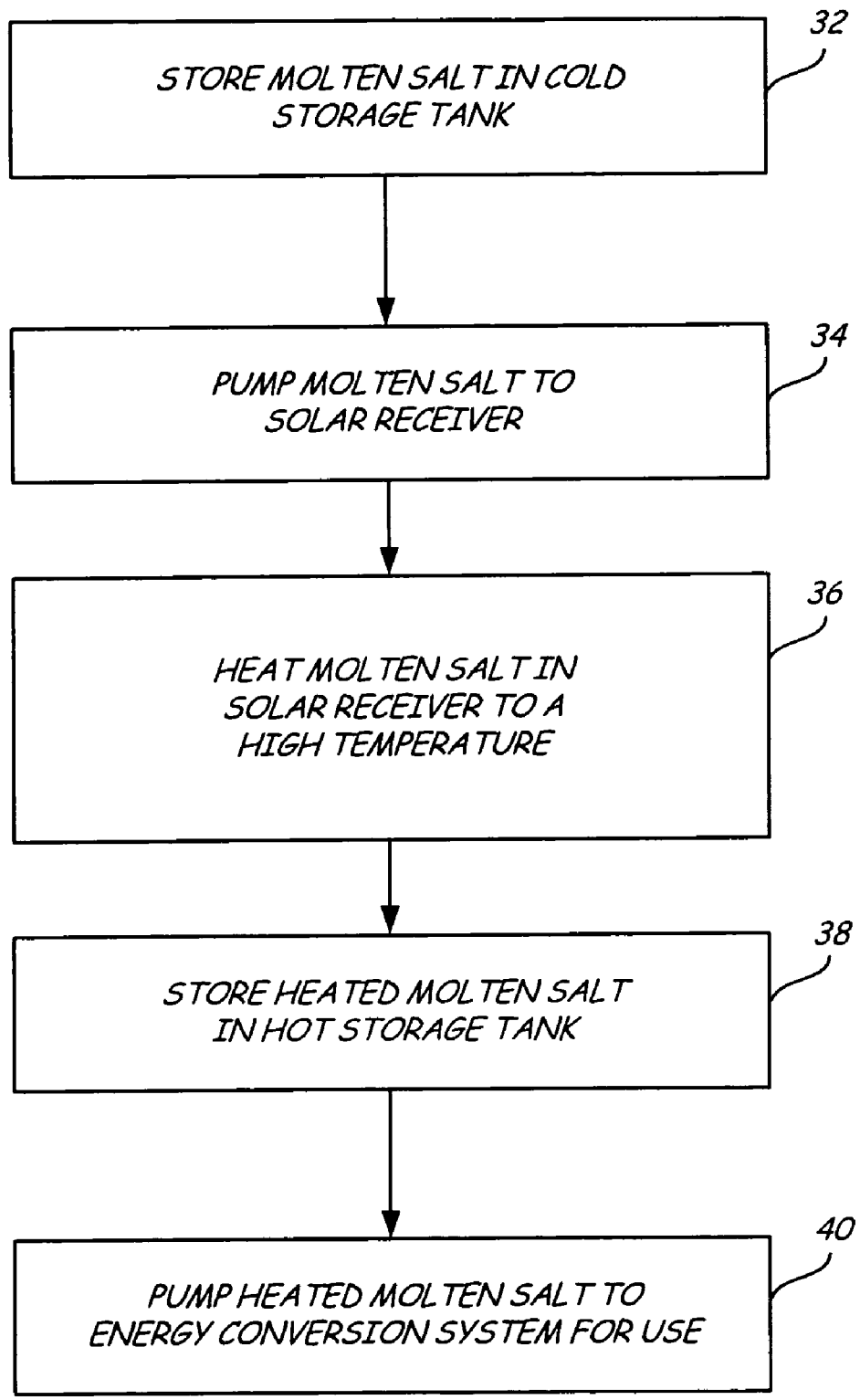
FIG. 2 is a diagram of a method of using the high temperature molten salt as the heat transfer medium of the solar power tower system.

FIG. 2 shows a diagram of a method of using high temperature molten salt as the heat transfer medium of solar power tower system 10. As previously mentioned, the molten salt is initially stored in cold storage tank 12, Box 32. When needed, the molten salt is pumped to solar receiver 14 (Box 34) and heated to a high temperature, for example, a temperature of at approximately least 1200° F., Box 36. As shown in Box 38, the heated molten salt is then sent to hot storage tank 18 until needed by energy conversion system 20. The heated molten salt is pumped to energy conversion system 20, where the power generated by exchanging the heat from the molten salt to air is used to operate an external system, Box 40. At higher temperatures, solar power tower system 10 is more efficient than conventional energy conversion systems and can be used for a large variety of purposes. For example, the power generated by solar power tower system 10 can be used to produce hydrogen, desalinate water, process heat, operate thermo-chemical plants, and provide electric power.

The solar power tower system of the present invention uses a molten salt heat transfer medium capable of being heated to high temperatures in combination with a solar receiver capable of withstanding high temperatures to run an energy conversion system. The energy conversion system is an air Brayton cycle conversion system rather than a conventional steam Rankine cycle conversion system. At the high temperatures of, for example, at least approximately 1200° F., preferably at least approximately 1500° F., more preferably at least approximately 1700° F., and most preferably at least approximately 1800° F., the solar power tower system is more efficient and capable of producing energy for numerous types of systems, such as a gas power turbine coupled to an electric generator.

Although the present invention has been described with reference to preferred embodiments, workers skilled in the art will recognize that changes may be made in form and detail without departing from the spirit and scope of the invention.

The invention claimed is:

1. A high temperature solar power tower system comprising:
    a molten fluoride salt heat transfer medium selected from the group consisting of: FLiNaK, FLiBe, FLiNaBe, FLiKBe, and combinations thereof capable of being heated to a temperature of at least about 1800 degrees Fahrenheit;
    a high temperature solar receiver for heating the molten salt formed from a material selected from the group consisting of: an iron based alloy, a nickel based alloy, and a cobalt based alloy; and
    a Brayton cycle energy conversion system for generating power with the heated molten salt.

2. A solar power tower system capable of converting solar power to useful energy, the system comprising:
    a molten fluoride salt heat transfer medium selected from the group consisting of: FLiNaK, FLiBe, FLiNaBe, FLiKBe, and combinations thereof for powering a Brayton cycle energy conversion system; and
    a high temperature solar receiver for heating the molten salt formed from a material selected from the group consisting of: an iron based alloy, a nickel based alloy, and a cobalt based alloy to a temperature of at least about 1800 degrees Fahrenheit.

3. A method of using high temperature molten fluoride salt in a solar power tower system, the method comprising:
    storing the molten fluoride salt selected from the group consisting of: FLiNaK, FLiBe, FLiNaBe, FLiKBe, and combinations thereof in a cold storage tank;
    pumping the molten fluoride salt to a high temperature solar receiver for heating the molten salt formed from a material selected from the group consisting of: an iron based alloy, a nickel based alloy, and a cobalt based alloy;
    heating the molten fluoride salt to a temperature of at least 1800° F.;
    storing the heated molten salt in a hot storage tank;
    pumping the heated molten salt to a Brayton cycle energy conversion system to generate power; and
    returning the molten salt to the cold storage tank.

4. The method of claim 3, wherein the power generated by the energy conversion system is used for at least one of hydrogen production, desalination of water, powering a heat/thermo-chemical plant, and producing electrical power.

* * * * *